(12) United States Patent
Claerhout et al.

(10) Patent No.: US 10,375,884 B2
(45) Date of Patent: Aug. 13, 2019

(54) SELF-PROPELLED HARVESTER WITH FRONT ACCESS TO CROP PROCESSING APPARATUS

(71) Applicant: AGCO Corporation, Duluth, GA (US)

(72) Inventors: Bryan S. Claerhout, Hesston, KS (US); James H. Rogers, Hesston, KS (US); Justin Dameron, Hesston, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 15/746,998

(22) PCT Filed: Jun. 10, 2016

(86) PCT No.: PCT/IB2016/000802
§ 371 (c)(1),
(2) Date: Jan. 23, 2018

(87) PCT Pub. No.: WO2017/029542
PCT Pub. Date: Feb. 23, 2017

(65) Prior Publication Data
US 2018/0213720 A1 Aug. 2, 2018

Related U.S. Application Data

(60) Provisional application No. 62/206,373, filed on Aug. 18, 2015.

(51) Int. Cl.
*A01D 41/12* (2006.01)
*A01F 12/10* (2006.01)
(Continued)

(52) U.S. Cl.
CPC .......... *A01D 41/12* (2013.01); *A01D 61/008* (2013.01); *A01F 7/067* (2013.01); *A01F 12/10* (2013.01); *A01F 12/444* (2013.01); *A01F 12/446* (2013.01)

(58) Field of Classification Search
CPC ...... A01D 41/06; A01D 41/12; A01D 61/008; A01F 12/10; A01F 7/067; A01F 12/446; A01F 12/444
See application file for complete search history.

(56) References Cited

U.S. PATENT DOCUMENTS 3,470,881 A 10/1969 Knapp et al.
3,659,403 A * 5/1972 Reaves ................. A01D 41/14
56/10.2 R (Continued)

FOREIGN PATENT DOCUMENTS

GB 2032748 A 5/1980

OTHER PUBLICATIONS

European Patent Office, International Search Report for Parent International Application No. PCT/IB2016/000802, dated Aug. 30, 2016.

*Primary Examiner* — Arpad Fabian-Kovacs

(57) ABSTRACT

A self-propelled harvester such as a combine harvester including a frame having a main frame assembly and a pair of secondary frame members attached thereto. The main frame assembly supports crop processing apparatus. A feederhouse and a tangential-flow crop impelling rotor are journaled between the secondary frame members. The secondary frame members are conveniently removable from the main frame assembly for accessing the processing apparatus from a front end of the harvester.

18 Claims, 6 Drawing Sheets

(51) Int. Cl.
    *A01D 61/00*     (2006.01)
    *A01F 7/06*     (2006.01)
    *A01F 12/44*     (2006.01)

(56) References Cited

U.S. PATENT DOCUMENTS

| | | | | |
|---|---|---|---|---|
| 4,197,693 | A | * | 4/1980 | Bernhardt .............. A01D 41/14 56/14.6 |
| 4,202,154 | A | | 5/1980 | Shriver et al. |
| 4,205,511 | A | * | 6/1980 | Todd ...................... A01D 41/14 56/14.6 |
| 4,267,687 | A | * | 5/1981 | Neuhring ................ A01D 41/12 56/14.4 |
| 4,315,395 | A | * | 2/1982 | Randall .................. A01D 41/14 280/765.1 |
| 4,450,671 | A | | 5/1984 | Love |
| 6,421,993 | B1 | * | 7/2002 | Mackin ................ A01D 61/008 56/219 |
| 2005/0016146 | A1 | * | 1/2005 | Shidler .................. A01D 41/06 56/16.4 R |
| 2014/0237980 | A1 | * | 8/2014 | Verhaeghe ........... A01D 41/145 56/320.1 |
| 2015/0121829 | A1 | * | 5/2015 | Duquesne .............. A01D 41/12 56/11.9 |
| 2016/0345498 | A1 | * | 12/2016 | De Lathauwer ....... A01D 41/06 |
| 2017/0251606 | A1 | * | 9/2017 | Van Overschelde ... A01F 12/10 |
| 2018/0007832 | A1 | * | 1/2018 | Matousek .............. A01F 12/10 |

* cited by examiner

SELF-PROPELLED HARVESTER WITH FRONT ACCESS TO CROP PROCESSING APPARATUS

BACKGROUND OF THE INVENTION

Field of the Invention

The invention relates to self-propelled harvesters that carry a harvesting header which collects and gathers crop material, the harvesters comprising processing apparatus to process the gathered crop material. In particular, the invention relates to a harvester frame and to a method of disassembling a harvester.

Description of Related Art

Self-propelled harvesters are well known and include, by way of example, combine harvesters, windrowers and forage harvesters, all of which typically include a frame or chassis, a drivers cab, an engine and ground engaging wheels or tracks. A cutting or pick-up header is often carried by the harvester, the header typically being considerably wider than the harvester and mounted to the front side of a feederhouse. Crop material collected by the header is conveyed into the feederhouse before being conveyed in a generally rearward direction to crop processing apparatus. In the case of a combine harvester, the processing apparatus serves to thresh the crop material and separate grain therefrom, whereas, in the case of a forage harvester or windrower the crop material is passed through conditioning rollers for example.

Access to the crop processing apparatus for the purposes of maintenance is often convoluted and time consuming. In the event of machine failure this can result in significant downtime during the critical harvesting period.

BRIEF SUMMARY OF THE INVENTION

According to a first aspect of the invention there is provided a self-propelled harvester comprising:
- a frame;
- a feederhouse pivotally mounted to the frame by a first set of bearings to permit movement around a transverse first axis between a lowered position and a raised position, the feederhouse having front attachment means for supporting a detachable harvesting header;
- a tangential-flow crop impelling rotor located downstream of the feederhouse, the rotor being mounted by a second set of bearings to the frame for rotation on a transverse second axis and comprising crop impelling elements adapted to convey crop rearwardly;
- crop processing apparatus supported by the frame downstream of the rotor;
- wherein the frame comprises a main frame assembly adapted to support the crop processing apparatus, and a pair of secondary frame members which are separable from the main frame assembly and is adapted to support the first and second sets of bearings.

Many self-propelled harvesters comprise a tangential-flow crop impelling rotor mounted downstream of, or behind, the feederhouse. In some embodiments the crop impelling rotor simply serves to convey crop material from an elevator housed within the feederhouse to the crop processing apparatus. In other embodiments the crop impelling rotor itself serves to process the crop in some way, for example by threshing or condition the conveyed crop material upstream of the crop processing apparatus.

By mounting both the feederhouse and the crop impelling rotor to a secondary frame which is separable from the main frame assembly simple access to the crop processing apparatus through the front of the harvester is enabled. Gaining of access to the processing apparatus for maintenance in this way is far less cumbersome and time consuming than accessing via conventional methods, through the rear of the machine for example, thus saving on machine downtime at critical times.

In one preferred embodiment the harvester is a combine harvester wherein the processing apparatus comprises an axial flow rotary processor which includes a threshing section and a separating section downstream of the threshing section, wherein the rotary processor comprises a rotor cage and a processing rotor which is supported for rotation inside the rotor cage on a generally fore-and-aft axis, and wherein the rotary processor is operable to receive crop material through an inlet provided at a front end of the rotor cage, convey the crop material in a generally rearward spiral path around the processing rotor, and discharge residue crop material through an outlet provided at a rear end of the rotor cage, wherein the rotor cage comprises a grate through which separated grain kernels can pass. The gaining of service access to axial flow separating rotors in known combine harvesters is notoriously difficult and time-consuming often requiring the removal of many critical drives and heavy components. By facilitating quick and easy removal of the feederhouse and crop impelling rotor, the rotary processors can be conveniently accessed, or even removed, via the front of the harvester. This represents a considerably time saving over the servicing of known axial flow processors.

In another embodiment of the invention the harvester is a combine harvester and the crop impelling rotor is operable as a threshing cylinder, wherein threshing elements are mounted to a rotor core and the rotor is operable to thresh crop material which passes between the threshing elements and a concave structure which surrounds a portion of a swept envelope of the threshing elements. The combine harvester in this case may comprise a hybrid processor having one or two axial flow separators, or a conventional processor having a plurality of straw walkers.

Alternatively the harvester may be a windrower, a sugarcane harvester or a forage harvester.

In yet another preferred embodiment the main frame assembly comprises a pair of side walls each having a profile which defines a respective forward-facing jaw. The secondary frame assembly comprises a pair of side members which each slot into a respective one of the jaws. Each side member supports one bearing from the first set of bearings and one bearing from the second set of bearings. Advantageously, the secondary frame, complete with feederhouse and rotor, can be conveniently pulled away from the front of the main frame thus accessing the crop processing apparatus from the front without having to dismantle the impelling rotor.

Each jaw preferably comprises a lower edge having a forward portion and a rear portion which is elevated with respect to the forward portion. Advantageously, the forward portion forms a ledge onto which a rear portion of the secondary frame assembly can be lowered thus bearing the weight of the crop impelling rotor at an intermediate stage of removal.

According to a second aspect of the invention there is provided a self-propelled agricultural harvester comprising:
- a frame having a main frame assembly and a pair of secondary frame members fastened to the main frame assembly; and, a crop processing apparatus supported on the main frame assembly;

a feederhouse and a tangential-flow crop impelling rotor journaled to and between the secondary frame members.

The secondary frame members are preferably slideably received in a forward-facing jaw defined in an exterior profile of the main frame assembly.

According to a third aspect of the invention there is provided a method of disassembling a self-propelled harvester comprising the steps of:

unfastening a secondary frame from a main frame, the secondary frame having secured thereto a feederhouse and a crop impelling rotor, the main frame having grain separating apparatus secured thereto; and then, removing the secondary frame from the main frame from a front side of the harvester.

According to a fourth aspect of the invention there is provided a method of assembling a self-propelled harvester comprising the steps of:

assembling a main frame;

securing processing apparatus supported to the main frame, the processing apparatus comprising grain separating apparatus;

providing a secondary frame;

mounting a feederhouse to the secondary frame by a first set of bearings to permit pivoting movement of the feederhouse around a transverse first axis, the feederhouse having front attachment means for supporting a detachable harvesting header;

mounting a tangential-flow crop impelling rotor to the secondary frame by a second set of bearings to permit rotation on a transverse second axis, the rotor comprising crop impelling elements adapted to convey crop rearwardly from the feederhouse; and, securing the secondary frame to the main frame.

By providing a secondary frame assembly, a sub-assembly of the feederhouse and crop impelling rotor can be assembled on a production line before being mounted to the main frame, thus simplifying and speeding up production.

The invention significantly improves access to crop processing apparatus of a harvesting machine, especially, but not exclusively so, for a combine harvester having an axial-flow or rotary processor wherein access thereto is achieved from the front of the harvester. In the preparation for servicing of the processing apparatus the secondary frame assembly, together with the feederhouse and crop impelling rotor, is simply unfastened and removed from the front of the harvester thus revealing the processing apparatus for service in situ or removal thereof.

BRIEF DESCRIPTION OF THE DRAWINGS

Further advantages of the invention will become apparent from reading the following description of specific embodiments with reference to the appended drawings in which.

DETAILED DESCRIPTION OF SPECIFIC EMBODIMENTS

Relative terms such as 'front', 'rear', 'left', 'right', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the associated rotation axis.

Figure 1:
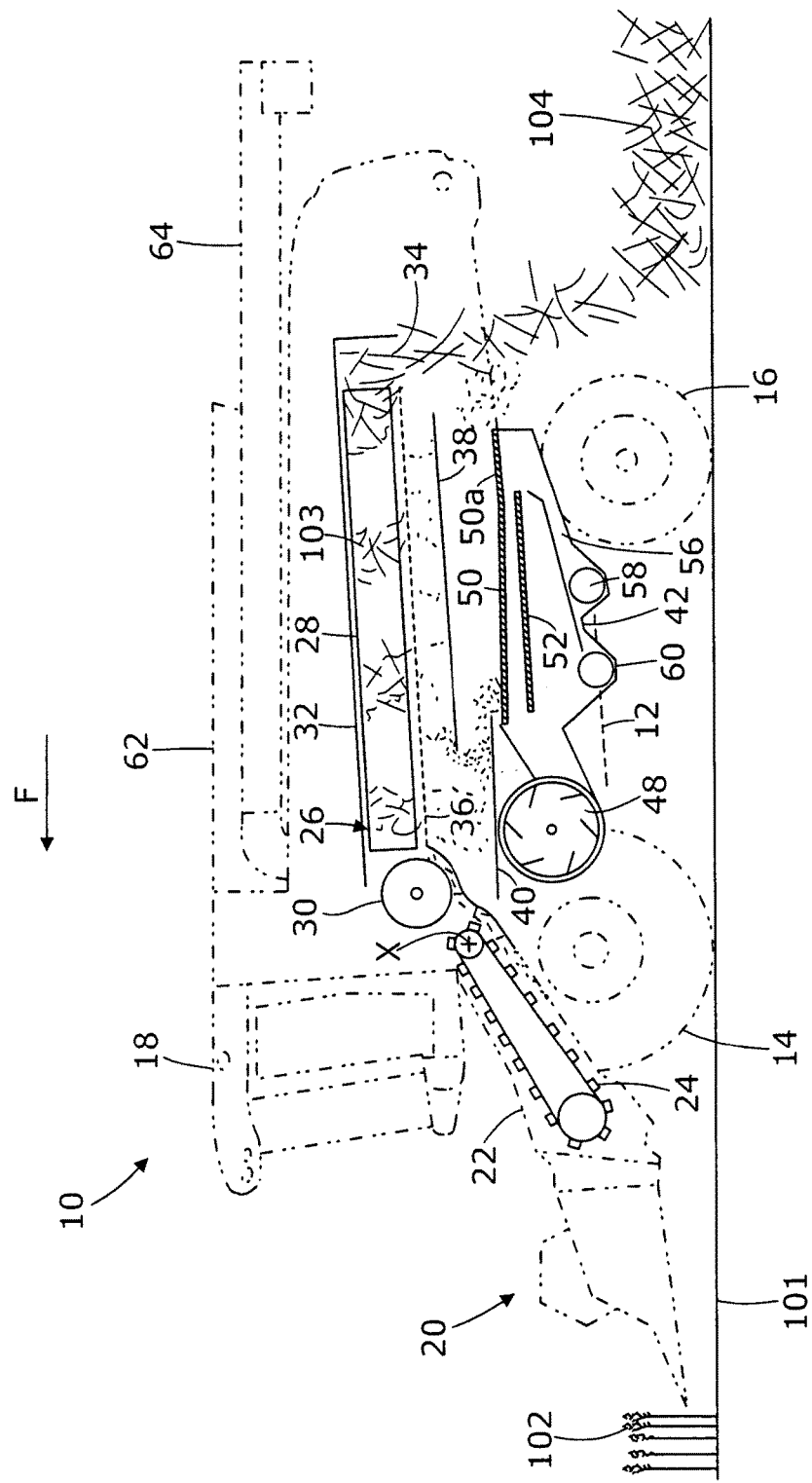
FIG. 1 is a schematic side view of a combine harvester with the inner workings revealed, the harvester having an axial-flow processor.

FIG. 1 illustrates in schematic form the main components of the crop processing systems of a combine harvester 10 and will be used to explain the flow of material below. The crop processing system is shown in solid lines whilst the outline profile of harvester 10 is shown in ghost form. Thereafter, a specific embodiment of the invention will be described.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, in the form of a chain and slat elevator, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes an axial flow threshing and separating rotor 28 fed by a tangential flow, crop material impelling, feed beater 30.

Figure 3:
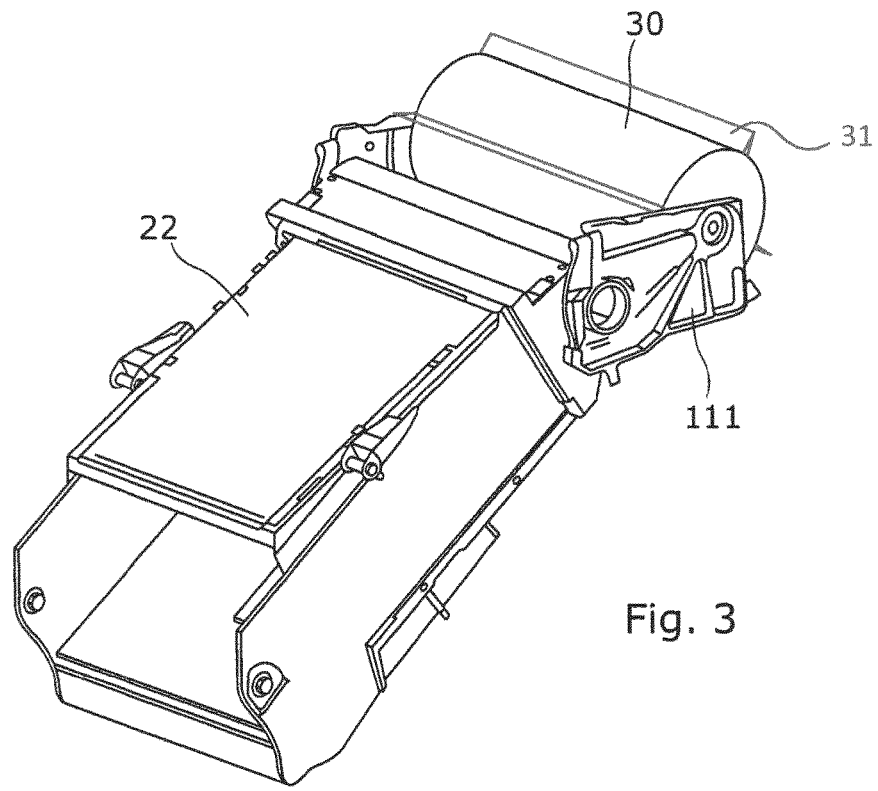
FIG. 3 is a front left perspective view of the feederhouse and feed beater of the combine harvester of FIG. 2, the feederhouse and feed beater shown mounted to a secondary frame assembly in accordance with an aspect of the invention.

The feed beater 30 rotates on a transverse axis and comprises crop engaging elements or beater vanes 31 (FIG. 3) which convey the crop material stream under the beater and into rotor housing 32 which houses said rotor 28.

The rotor 28 is positioned to have a generally longitudinal, or fore and aft, rotation axis which is normally inclined upwardly towards the rear of the combine 10.

Flighting elements (not shown) provided on the front end of rotor 28 engage the crop material stream which is then conveyed as a ribbon or mat 103 in a generally rearward axial and helical path in the space between the rotor 28 and the rotor housing 32.

Axial flow rotor 28 serves to thresh the crop stream in a front region, separate the grain therefrom in a rear region, and eject the straw residue through an outlet 34 in the housing 32 at the rear of the machine either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a grain pan 40 located below a front section of the processor 26. In reality the separated material falling through the grate 36 is typically a mix of grain and material other than grain (MOG) which may include chaff, tailings and some straw.

Although the crop processor illustrated comprises a single axial-flow separating rotor, in an alternative embodiment a pair of side-by-side rotors are employed instead.

The return pan 38 and grain pan 40 convey the separated crop material to a grain cleaning shoe designated generally at 42. The grain-MOG mix falls from the rear edge of the grain pan 40 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at 54. A rear section of chaffer 50a is commonly independently adjustable and is configurable to allow unthreshed tailings to pass therethrough into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling therethrough is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

Figure 2:
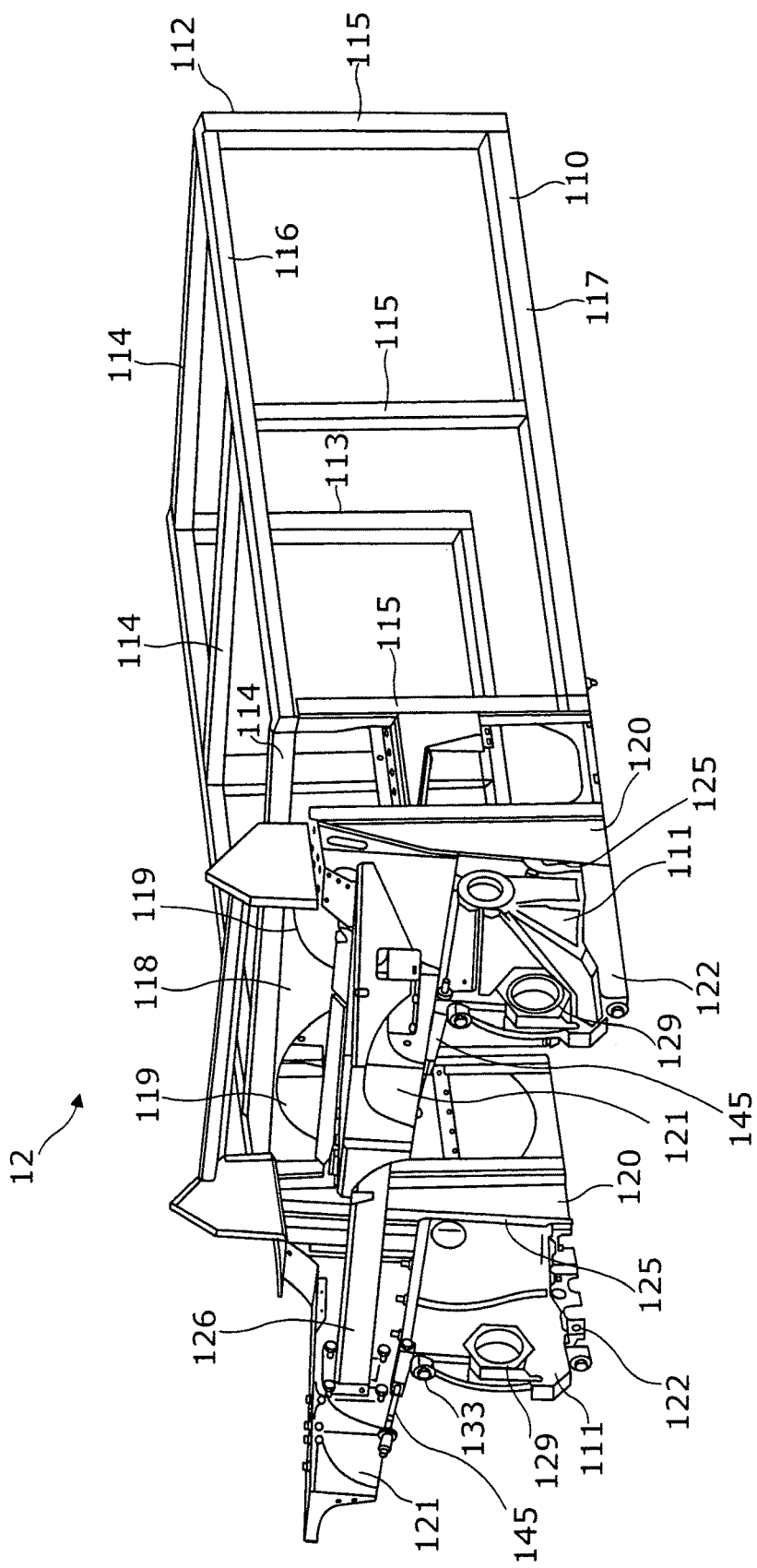
FIG. 2 is a front left perspective view of a frame of the combine harvester of FIG. 1.

The frame 12 serves to provide structural integrity for the overall harvester 10 and is shown in part in FIG. 2. The frame 12 is rigid and comprises a main frame assembly 110 and a pair of secondary frame members 111. The main frame assembly 110 serves to support the weight of the engine (not shown), processor 26, grain pans 38, 40, the cleaning shoe 42, grain tank 62 and the unloading system 64.

Shown schematically in FIG. 2, the main frame assembly 110 can be considered as comprising a left-hand side wall section 112 and a right-hand side wall section 113 connected together by a plurality of transverse brace members 114. Each side wall comprises a plurality of spaced upright pillars 115 connected together by upper and lower longitudinal beams 116, 117. The various structural members described are fastened together by any known fastening means such as welding, gluing or bolting to name but a few.

The upright, transverse and longitudinal members 115, 114, 116, 117 effectively form a rigid cage inside which the processor 26 and cleaning shoe 42 are mounted. FIG. 2 shows, for example, an upright transverse plate 118 having a pair of semi-circular cut-outs 119 which surround an upper portion of the rotor housing 32.

The front end of each side section 112,113 includes an upright pillar 120, an upper beam 121, and a lower beam 122, wherein each of the upper and lower beams 121,122 extend forwardly from the respective pillar 120 so as to define a forwardly-facing jaw 125. The upper and lower beams 121,122 are fastened to the pillar 120 by bolts or other suitable fastening means. A strengthening transverse strut 126 extends between the upper beams 121.

Each of the pair of transversely spaced secondary frame members 111 comprises a unitary cast body. The secondary frame members 111 between them support the weight of the feederhouse 22 and the feed beater 30. As will be described in more detail below, the feederhouse 22 and feed beater 30 can be simply removed to access the front of the processor 26 by removal of the secondary frame members 111 from the main frame 110. The material of the secondary frame members 111 typically comprises steel. However, alternative, lighter weight options could be employed instead such as composites.

In the illustrated embodiment each secondary frame member 111 has a peripheral profile that defines a forward-facing recess 128 that accepts a respective bearing housing 129 which supports a bearing 130. The bearing 130 bears a shaft 132 (FIG. 5) which is aligned along axis x, the shaft 132 (shown in FIG. 5 only) serving to provide the pivoting connection for the feederhouse 22 and upon which upper sprockets (not shown) of the elevator 24 are journaled. The bearing housing 129 is bolted to the respective secondary frame member 111 by bolts 133.

Alternatively, the bearing housing 129 can be cast into the profile of the secondary frame member 111.

Figure 7:
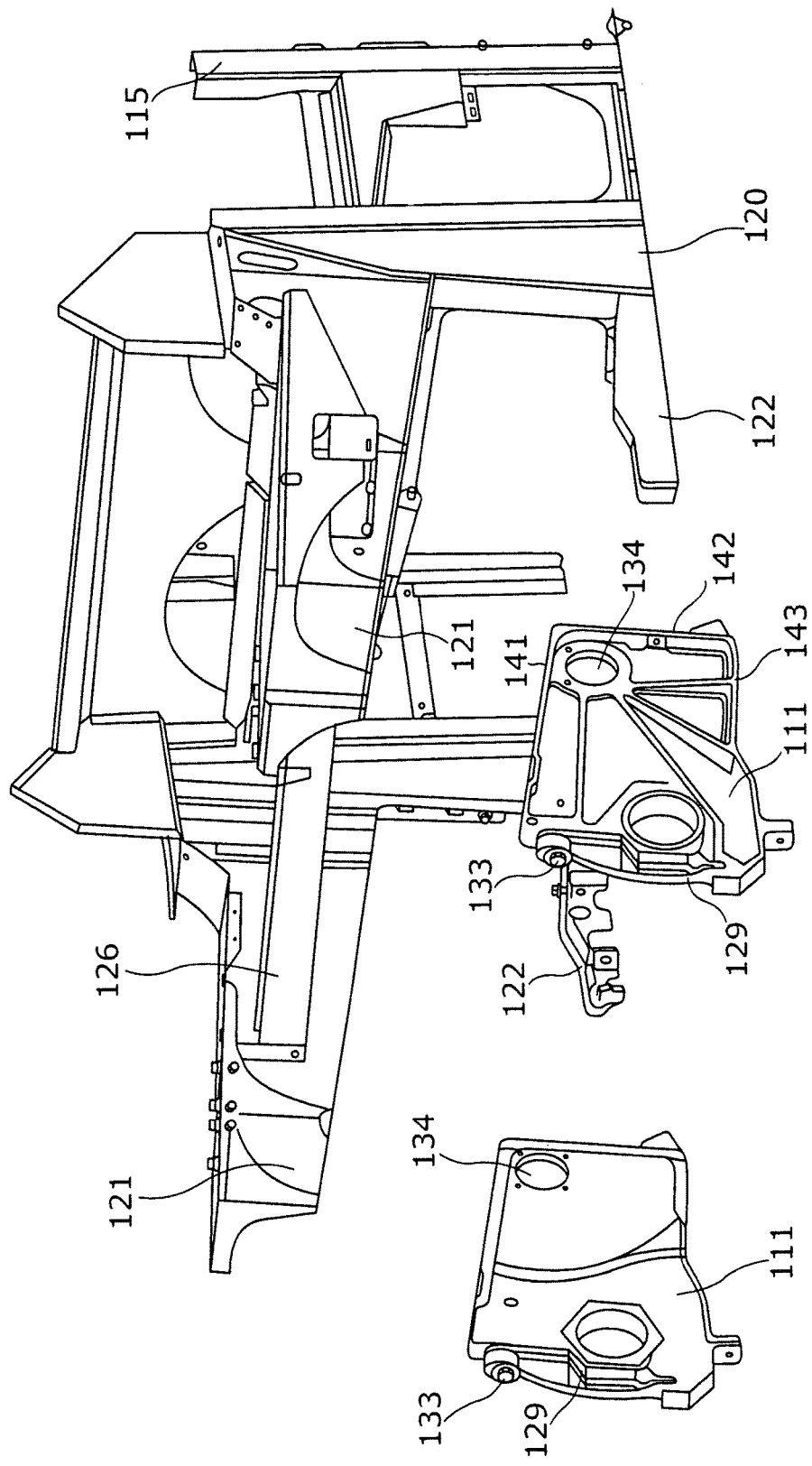
FIG. 7 is a fragmentary view of the frame of FIG. 2 showing the secondary frame assembly separated from the first frame assembly.

Each secondary frame member comprises a circular aperture 134 (FIG. 7) which serves as a bearing housing for a second set of bearings 135 for supporting the feed beater 30 in rotation. The bearings 135 are typically press fit into the apertures and are secured with a roll pin for example. It should be appreciated that the bearings 135 are only shown in FIG. 5 and are omitted from the other drawings.

The feed beater 30 comprises a pair of stub shafts 136 which extend axially from each end, each stub shaft being received in a respective one of the bearings 135. A belt and pulley system (not shown) serves to drive the feed beater 30 via the stub shafts 136, wherein a driven pulley is keyed to one of the stub shafts 136 externally of the secondary frame member 111.

Both the feederhouse 22 and feed beater 30 are thus journaled to and between the secondary frame members 111. The feederhouse 22 can be pivoted with respect to the secondary frame members 111 around axis x between a raised and a lowered position, the movement controlled by a pair of not shown hydraulic cylinders. The feed beater 30 is operable to rotate on its axis.

Figure 4:
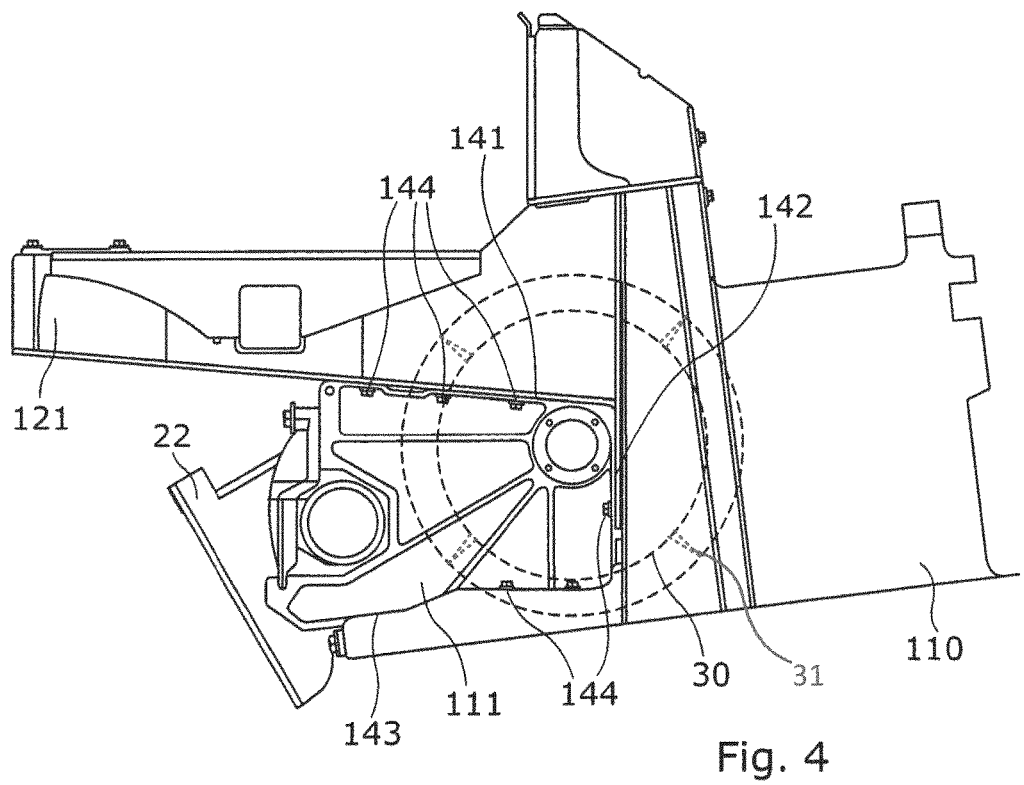
FIG. 4 is a left side view of a front portion of the frame of FIG. 2 showing the secondary frame assembly in engagement with the first frame assembly.
Figure 5:
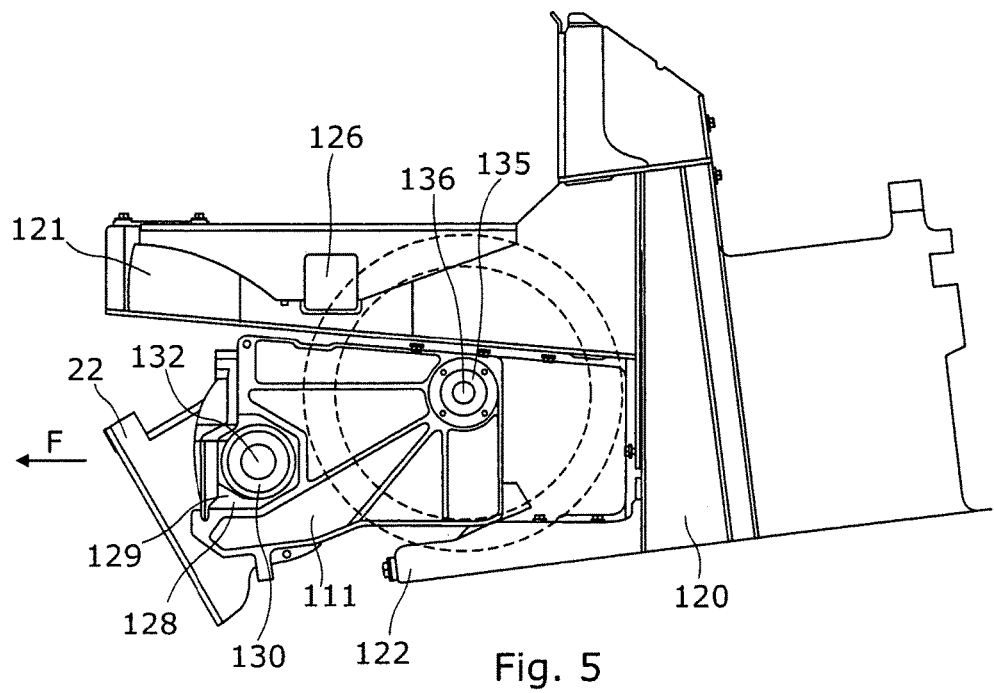
FIGS. 5 and 6 are the same view as FIG. 4 but showing the secondary frame assembly partly shifted forwards corresponding to intermediate stages of removal.
Figure 6:
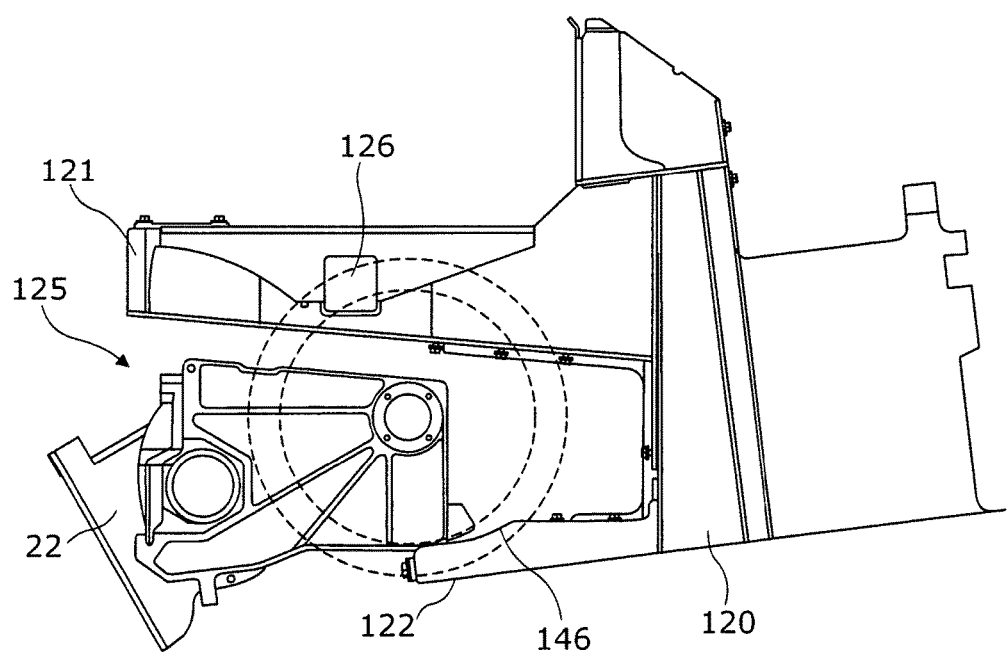

As mentioned above, and in accordance with aspects of the invention, the feederhouse 22 and feed beater 30 can be conveniently separated from the main frame 110 by unfastening and removing the secondary frame members 111. With particular reference to FIGS. 4 to 6 the process for removal of the feederhouse 22 and feed beater 30 will now be described.

FIG. 4 shows from the left-hand side the secondary frame member 111 secured in position in the jaw 125 with the upper edge 141, rear edge 142 and bottom edge 143 all abutting a conforming edge of the jaw 125 providing by the upper beam 121, pillar 120 and lower beam 122 respectively. Bolts 144 secure the secondary frame member 111 in position. The feed beater 30 and its beater vanes 31 are shown in dashed form together with the swept envelope of the beater vanes 31.

In a first stage of removal, a temporary support 145 is attached to each of the secondary frame castings 111. The temporary supports 145 serve to support the feed beater 30 when removed from the main frame in a subsequent step. When not required the supports 145 may be secured to the feederhouse or main frame for storage.

With the header 20 detached from the feederhouse 22, the weight of the feederhouse 22 is supported by an appropriate lifting tool such as a crane or a fork-lift truck. The belts, drives and lift cylinders (not shown) associated with the feederhouse 22 and the feed beater 30 are disconnected or removed. The bolts 144 are then removed to unfasten the secondary frame members 141 from the surrounding components of the main frame assembly 110.

The assembly comprising the feederhouse 22, feed beater 30 and secondary frame members 111 is then pulled in the forward direction (arrow F) to separate the secondary frame members 111 from the pillar 120 (FIG. 5). The tapered shape of the jaw 125 ensures that the secondary frame members can be slid forwardly with the weight of the assembly being born by the lower beam 122.

The lower beams 122 each have a profile that provides a shoulder 146 in the upper edge thereof. As the assembly 22,30,111 is pulled forward the secondary frame members 111 are slid down the respective shoulders 146 as shown (side-on) in FIG. 6.

The assembly is then pulled away from the combine as a unit by the lifting gear. The assembly, comprising the feederhouse 26, the feed beater 30 and secondary frame members 111 is shown in isolation in FIG. 3. The secondary frame members 111 are shown in isolation and spaced from the main frame 110 in FIG. 7.

Advantageously, the front end of the processor 26 can then be accessed from the front. If desired, for repair for example, the processing rotors 28 can be accessed by firstly removing the front bearing supports (not shown). The rotors 28 can then be conveniently removed from the front end of the rotor housing 32.

Figure 8:
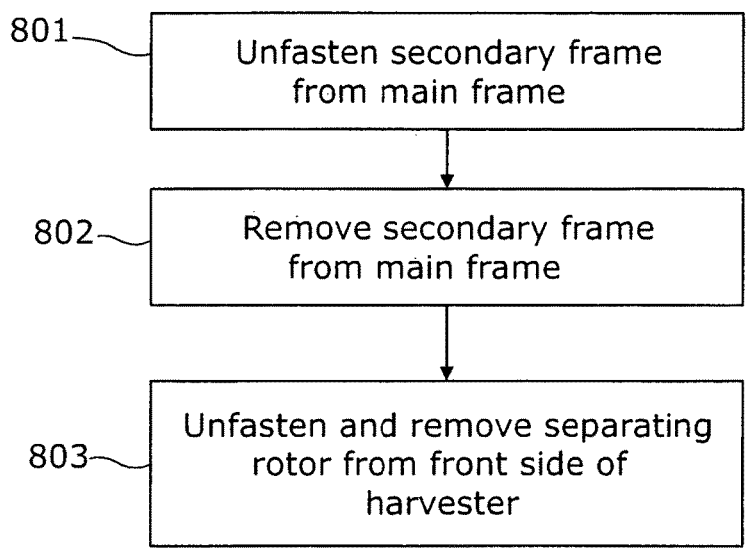
FIG. 8 shows a process flow in accordance with another aspect of the invention; and, FIG. 9 is a schematic side view of a combine harvester in accordance with an alternative embodiment of the invention.

With reference to FIG. 8, an exemplary method in accordance with one aspect of the invention is illustrated in the form of a flow chart. In a first step 801 the secondary frame members 111 are unfastened from the main frame assembly 110. In a second step 802 the secondary frame members 111 together with the feederhouse 22 and feed beater 30 are removed from the main frame assembly 110. In a third step 803 the processor rotor 28 is unfastened and removed from the front side of the harvester 10.

Although described thus far in relation to a combine harvester having a rotary processor, it is envisaged that aspects of the invention can apply to combine harvesters having alternative processor arrangements. For example, and as illustrated in FIG. 9, a combine harvester 210 embodying aspects of the invention comprises a conventional threshing cylinder 226 which rotates on a transverse axis y and is disposed immediately downstream of the feederhouse 222.

Figure 9:
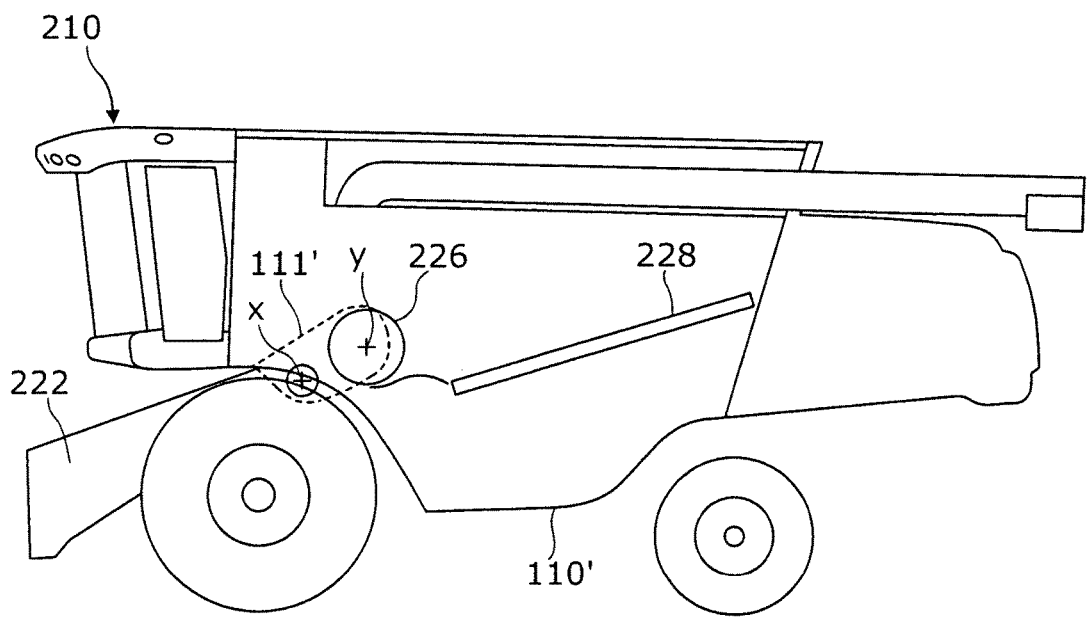

With respect to the current invention the threshing cylinder 226 of FIG. 9 replaces the feed beater 30 of the above-described invention and is journaled between a pair of secondary frame members 111'. Therefore, the threshing cylinder 226, feederhouse 222 and secondary frame members 111' can be removed from the main frame assembly 110' as a single assembly for ease of maintenance and servicing. The grain separating apparatus of the combine of FIG. 9 is shown schematically as a set of straw walkers 228. However, it should be appreciated that the grain separating apparatus may instead include one or two rotary processors instead, that is in a hybrid type arrangement.

Although described in relation to a combine harvester, it is envisaged that the invention can be embodied instead in alternative forms or self-propelled harvesters such as forage harvesters and windrowers.

In summary there is provided a self-propelled harvester such as a combine harvester comprises a frame having a main frame assembly and a pair of secondary frame members attached thereto. The main frame assembly supports crop processing apparatus. A feederhouse and a tangential-flow crop impelling rotor are journaled between the secondary frame members. The secondary frame members are conveniently removable from the main frame assembly for accessing the processing apparatus from a front end of the harvester.

It should be emphasized that the above-described embodiments of the present disclosure are merely possible examples of implementation, merely set forth for a clear understanding of the principles of the disclosure. Many variations and modifications may be made to the above-described embodiments of the disclosure without departing substantially from the spirit and principles of the disclosure.

The invention claimed is:

1. A self-propelled harvester comprising:
   frame comprising a main frame assembly and at least one secondary frame member separable from the main frame assembly;
   a feederhouse pivotally mounted to the at least one secondary frame member by a first set of bearings to permit movement around a transverse first axis between a lowered position and a raised position, the feederhouse structured to support a detachable harvesting header;
   a tangential-flow crop impelling rotor located downstream of the feederhouse, the rotor being mounted by a second set of bearings to the at least one secondary frame member for rotation on a transverse second axis and comprising crop impelling elements adapted to convey crop rearwardly; and
   crop processing apparatus supported by the frame downstream of the rotor.

2. The harvester according to claim 1, wherein the crop processing apparatus comprises an axial flow rotary processor which includes a threshing section and a separating section downstream of the threshing section, wherein the rotary processor comprises a rotor cage and a processing rotor which is supported for rotation inside the rotor cage on a generally fore-and-aft axis, and wherein the rotary processor is operable to receive crop material through an inlet provided at a front end of the rotor cage, convey the crop material in a generally rearward spiral path around the processing rotor, and discharge residue crop material through an outlet provided at a rear end of the rotor cage, wherein the rotor cage comprises a grate through which separated grain kernels can pass.

3. The harvester according to claim 2, wherein threshing elements are mounted to the processing rotor in the threshing section and separating elements are mounted to the processing rotor in the separating section.

4. The harvester according to claim 2, wherein the crop impelling rotor is operable to feed crop material into the inlet of the rotary processor.

5. The harvester according to claim 2, wherein the crop impelling rotor comprises a cylindrical rotor core and a plurality of beater vanes mounted to the rotor core.

6. The harvester according to claim 1, wherein the crop processing apparatus comprises an axial flow rotary separator comprising a rotor cage and a separating rotor which is supported for rotation inside the rotor cage on a generally fore-and-aft axis, and wherein the rotary separator is operable to receive crop material through an inlet provided at a front end of the rotor cage, convey the crop material in a generally rearward spiral path around the separating rotor, and discharge residue crop material through an outlet provided at a rear end of the rotor cage, wherein the rotor cage comprises a grate through which separated grain kernels can pass.

7. The harvester according to claim 6, wherein the crop impelling rotor comprises threshing elements mounted to a rotor core and wherein the crop impelling rotor is operable to thresh crop material which passes between the threshing elements and a concave structure which surrounds a portion of a swept envelope of the threshing elements.

8. The harvester according to claim 1, wherein the grain separating apparatus comprises a plurality of straw walkers.

9. The harvester according to claim 1, wherein the at least one secondary frame member comprises at least two secondary frame members.

10. The harvester according to claim 9, wherein the main frame assembly comprises a pair of side walls each having a profile which defines a respective forward-facing jaw, and wherein the secondary frame members each slot into a respective one of the jaws, and wherein each secondary frame member supports one bearing from the first set of bearings and one bearing from the second set of bearings.

11. The harvester according to claim 10, wherein each jaw comprises a lower edge having a forward portion and a rear portion which is elevated with respect to the forward portion.

12. The harvester according to claim 10, wherein the bearings of the first and second sets of bearings are secured inside respective bearing housings which are supported by the at least one secondary frame member.

13. The harvester according to claim 9, wherein the at least one secondary frame member comprises a unitary casting supporting at least one bearing from the first set of bearings and at least one bearing from the second set of bearings.

14. The harvester according to claim 1, wherein the main frame assembly defines a forward-facing jaw, and wherein the at least one secondary frame member fits within the jaw.

15. The harvester according to claim 14, wherein the at least one secondary frame member is rigidly secured within the jaw.

16. A self-propelled agricultural harvester comprising:
a main frame assembly defining a forward-facing jaw therein;
a pair of secondary frame members received within the forward-facing jaw and rigidly fastened to the main frame assembly;
a crop processing apparatus supported on the main frame assembly; and
a feederhouse and a tangential-flow crop impelling rotor journaled to and between the secondary frame members.

17. The harvester according to claim 16, wherein the secondary frame members are slideably received in the forward-facing jaw.

18. The harvester according to claim 16, wherein the forward-facing jaw is defined in an exterior profile of the main frame assembly.

* * * * *